(No Model.)
H. F. FULLER.
ACETYLENE GAS GENERATOR.
No. 578,055. Patented Mar. 2, 1897.
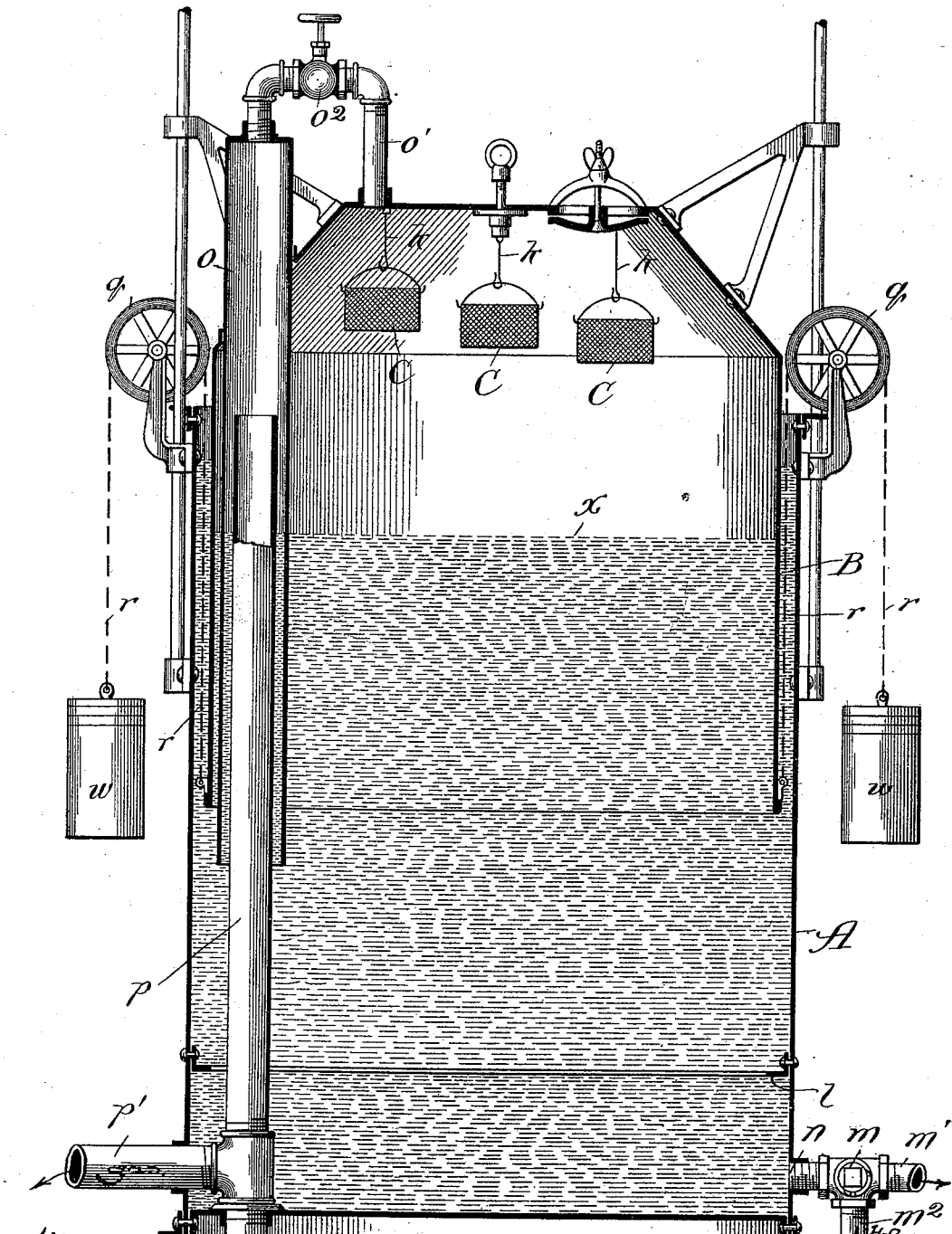
Witnesses:
Inventor:
Henry F. Fuller

UNITED STATES PATENT OFFICE.

HENRY F. FULLER, OF CHICAGO, ILLINOIS, ASSIGNOR TO THE WALMSLEY, FULLER & COMPANY, OF SAME PLACE.

ACETYLENE-GAS GENERATOR.

SPECIFICATION forming part of Letters Patent No. 578,055, dated March 2, 1897.

Application filed November 2, 1896. Serial No. 610,851. (No model.)

*To all whom it may concern:*

Be it known that I, HENRY F. FULLER, a citizen of the United States, residing at Chicago, in the county of Cook and State of Illinois, have invented a new and useful Improvement in Gas-Generators, of which the following is a specification.

My invention relates to an improvement in the class of gas-generators for generating gas by the chemical action of a liquid upon a solid material, as that of water upon calcium carbid, which produce acetylene gas by bringing them into contact with each other and for the manufacture of which, more particularly, I have devised my improvement, though the latter is intended for use with other liquid and solid materials, similarly adapted to generate gas by bringing them into contact, than water and calcium carbid.

The object of my improvement is the same as that of the subject of my Letters Patent granted January 19, 1897, and numbered 575,474, for an improvement in gas-generators, namely, to insure contact of the liquid progressively with the solid material, so as to subject only so much of the latter at one time to the action of the liquid as shall be required to generate enough gas to maintain the desired quantity in the generator and to prevent the entire or a large portion of the charge of solid material from becoming affected by the liquid, (as by capillary attraction,) so as to evolve gas continuously after the desired quantity has been attained in the generator, and when in consequence the body of liquid and that of solid material are forced and held apart. As set forth in my aforesaid application, this object is accomplished by supporting the solid material on a plane inclined with relation to the level of the liquid in the generator, whereby the desired progressive consumption referred to of the solid material is attained. I accomplish this object by differently-constructed means for the same purpose, forming the subject of the present application and illustrated in the accompanying drawing.

The drawing shows by a view in vertical sectional elevation a conventional general form of gas-generator equipped with my improvement.

A is the outer tank, and B the inner tank, shown to be supported by means of chains $r$, extending from near its lower edge over pulleys $q$ and carrying at their free ends the weights $w$. A stand-pipe $p$ extends through the base of the tank A, below which it is equipped with a drip-cock $v$, and near which base is a branch pipe $p'$, forming the gas-outlet, which leads to the point of storage or consumption. (Not shown.) A pipe $o$, depending through the top of the tank B, telescopes with the pipe $p$ and communicates from its upper end through a pipe $o'$, containing a shut-off valve $o^2$, with the tank B through its top. In the tank A, at the side thereof opposite that through which the outlet-pipe $p'$ extends, is an opening $n$, equipped with a three-way valve $m$ for controlling a discharge-pipe $m'$ for the withdrawal of sediment (lime) and a water-inlet pipe $m^2$ for admitting the supply of water into the generator, the level of which is indicated at $x$. Above the opening $n$ in the tank A is shown an annular ledge $l$, affording a stop for the tank B, below which it may not descend.

Suspended from the top of the tank B, to depend inside the latter, are holders C for the solid material, (calcium carbid,) shown as of open-work basket shape, though they may be of other desired form. These holders are supported to extend to different elevations in a plane inclined with relation to the water-level $x$, and are preferably, but not necessarily, supported by suspension, as through the medium of hangers, (indicated at $k$.)

The operation is as follows: When there is no gas in the tank B, or the quantity has fallen below a predetermined amount, the weight of the inner tank causes it to descend till the lowermost of the carbid-holders C contacts with the water, whereupon evolution of acetylene gas ensues, the gas eventually filling the pipes $p'$, $p$, $o$, and $o'$ and the tank B with the desired quantity, which lifts the inner tank and thus maintains the lowermost holder C out of contact with the water till the quantity is reduced, (by consumption of the generated gas.) Then the tank B again descends, but only far enough each time to produce contact with the water of the lowermost holder C until its contents have been consumed. Thereafter the descents of the inner tank will be farther and farther as the contents of the several carbid-holders at the different elevations become progressively consumed and until the supply becomes exhausted, when the holders have to be recharged.

As will be seen, by my improved arrangement for supporting the calcium carbid only a portion of the entire charge can be acted upon by the water at any one time, which is the object of my invention.

What I claim as new, and desire to secure by Letters Patent, is—

1. In a gas-generator of the character described the combination with the outer tank and the inner movable tank provided with a closed top, a plurality of hanger-rods of unequal length separately secured to the under side of said top, and depending inside the inner tank, a plurality of open-work holders for the solid material, said holders being removably suspended from the lower ends of said holder-rods whereby they are caused to assume different heights with relation to the liquid-level in the generator, and a manhole in said top adjacent to the said holders to permit access thereto, provided with a closure, substantially as and for the purpose set forth.

2. In a gas-generator of the character described, the combination with the outer tank and the inner tank movable vertically therein, of a series of separate and independent holders for the solid material, each of which is supported in the generator in fixed relation to the other and to the points of support at a different altitude from that of any other of the series, whereby the separate bodies of material are successively presented to the attacking liquid, substantially as described.

HENRY F. FULLER.

In presence of—
J. H. LEE,
R. T. SPENCER.